United States Patent [19]
Wilkerson

[11] Patent Number: 6,124,697
[45] Date of Patent: Sep. 26, 2000

[54] AC INVERTER DRIVE

[76] Inventor: Alan W. Wilkerson, c/o The Gemini Company, 161 N 4280 Taunton Ave., Cedarburg, Wis. 53012

[21] Appl. No.: 09/135,766

[22] Filed: Aug. 18, 1998

Related U.S. Application Data

[60] Provisional application No. 60/056,606, Aug. 20, 1997.

[51] Int. Cl.[7] ........................................ H02P 5/28
[52] U.S. Cl. ........................ 318/798; 318/808; 318/805; 318/807; 318/806; 318/801; 318/802
[58] Field of Search ................................ 318/798, 808, 318/805, 807, 806, 801, 802

[56] References Cited

U.S. PATENT DOCUMENTS

| | | | |
|---|---|---|---|
| 4,019,105 | 4/1977 | Cornell et al. | 318/808 X |
| 4,392,100 | 7/1983 | Stanton et al. | 318/808 X |
| 4,967,135 | 10/1990 | Ashikaga et al. | 318/808 |
| 5,480,220 | 1/1996 | Kumar | 318/808 X |

*Primary Examiner*—Karen Masih
*Attorney, Agent, or Firm*—Andrus, Sceales, Starke & Sawall

[57] ABSTRACT

A drive for controlling the speed of an AC induction motor from an inverter. The inverter applies a voltage to the stator winding of the motor in accordance with the magnitude of a first input signal. The inverter causes the voltage to be applied at a frequency determined by the magnitude of a second input signal to the inverter. The drive includes motor speed sensor and a motor speed reference signal source coupled to a speed regulating amplifier. A slip detector determines the slip of the motor from the speed of the rotor and the energization frequency of the stator winding. A slip regulating amplifier receives the output signal from the speed regulating amplifier and the slip signal and provides an output to a summing amplifier. The summing amplifier also receives a motor speed signal and provides an output. The output comprises the second input signal to the inverter. The output may be supplied through an absolute value circuit as the first input signal to the inverter. Low speed boost and load boost signals may be provided to the first input signal to the inverter. Alternatively, the output of the slip regulating amplifier may be employed as the second input signal to the inverter and to form the first input signal to the inverter.

31 Claims, 2 Drawing Sheets

AC INVERTER DRIVE

CROSS-REFERENCE TO RELATED APPLICATIONS

The present application is a continuation-in-part application of U.S. provisional application, Appln. No. 60/056,606, filed Aug. 20, 1997, now abandoned.

BACKGROUND OF THE INVENTION

One of the common approaches to the circuitry of an inverter drive for powering an AC motor at adjustable frequency provides power to the motor with the voltage proportional to frequency, often referred to as a constant volts per Hertz method. By applying the voltage proportional to frequency, an attempt is made to cause the excitation current of the motor and therefore the rotating motor flux to be constant at all frequencies, thereby making full torque available to the load.

However, load current causes an impedance voltage drop in the stator windings of the motor, and the resulting excitation is therefore somewhat dependent upon the load of the motor applied to its rotor. To avoid problems with this variation in excitation, the volts per Hertz is generally fixed at the full, rated load level. If the load is less than rated, the impedance drop will similarly be less than rated, and the excitation will be greater than desired, resulting in saturation of the motor core, and attendant excessive energy losses and heating of the motor.

An additional problem exists at low speeds. At relatively high speeds, or frequencies, the stator impedance is predominately inductive, and the constant volts per Hertz energization is reasonably effective in accomplishing the goal of constant flux. At very low frequencies, however, the resistance portion of the stator impedance becomes larger that the inductive reactance, and constant volts per Hertz results in a drop in motor flux, and a similar drop in available load torque.

This low speed problem is solved by increasing the voltage at low speeds, with a technique known as "low speed boost". An adjustment for the "boost" is common on many available inverter drives. Again, to allow good regulation with load variations, the voltage boost is set for full load, and motor losses tend to increase to an excessive level at light loads.

Constant volts per Hertz AC inverter drives usually do not have any means of limiting motor torque for motor and control protection, and generally "trip out" or disable the drive in the presence of excessive load.

More sophisticated AC inverter drives measure the actual speed of the motor shaft, the stator winding currents, and the applied frequency, and perform complex calculations to establish the proper excitation at all conditions of speed and load. These drives are commonly known as "vector drives" and are very successful in accomplishing their goals. This performance comes at a higher price, partly because of the need to measure stator winding currents, and partly because of the complexity of compensating for temperature variation in motor resistance in the calculation for determining the proper motor excitation.

BRIEF SUMMARY OF THE INVENTION

It is the purpose of this invention to approximate the performance of a "vector drive" with a simplified control system, which indirectly determines motor load torque, and uses this determination to vary the excitation to the motor, thereby providing required torque at all load conditions, but minimizing excessive heating at light loads. Torque limiting for motor protection is easily implemented. All of these objectives are accomplished without the need and accompanying costs to measure stator winding currents.

The AC inverter drive of the present invention forms a highly responsive, four quadrant control system suitable for use in such diverse applications as a treadmill drive or as a servo drive that provides accurate, rapid positioning of an element.

Various other features, objects, and advantages of the invention will be made apparent from the following detailed description and the drawing.

DETAILED DESCRIPTION OF THE INVENTION

It is well known that for moderate values of slip, the torque in an AC motor is linearly proportional to slip. Measurement of slip, therefore, will determine load torque, and regulation of the maximum value of slip will similarly limit the maximum torque that the motor will deliver.

Figure 1:
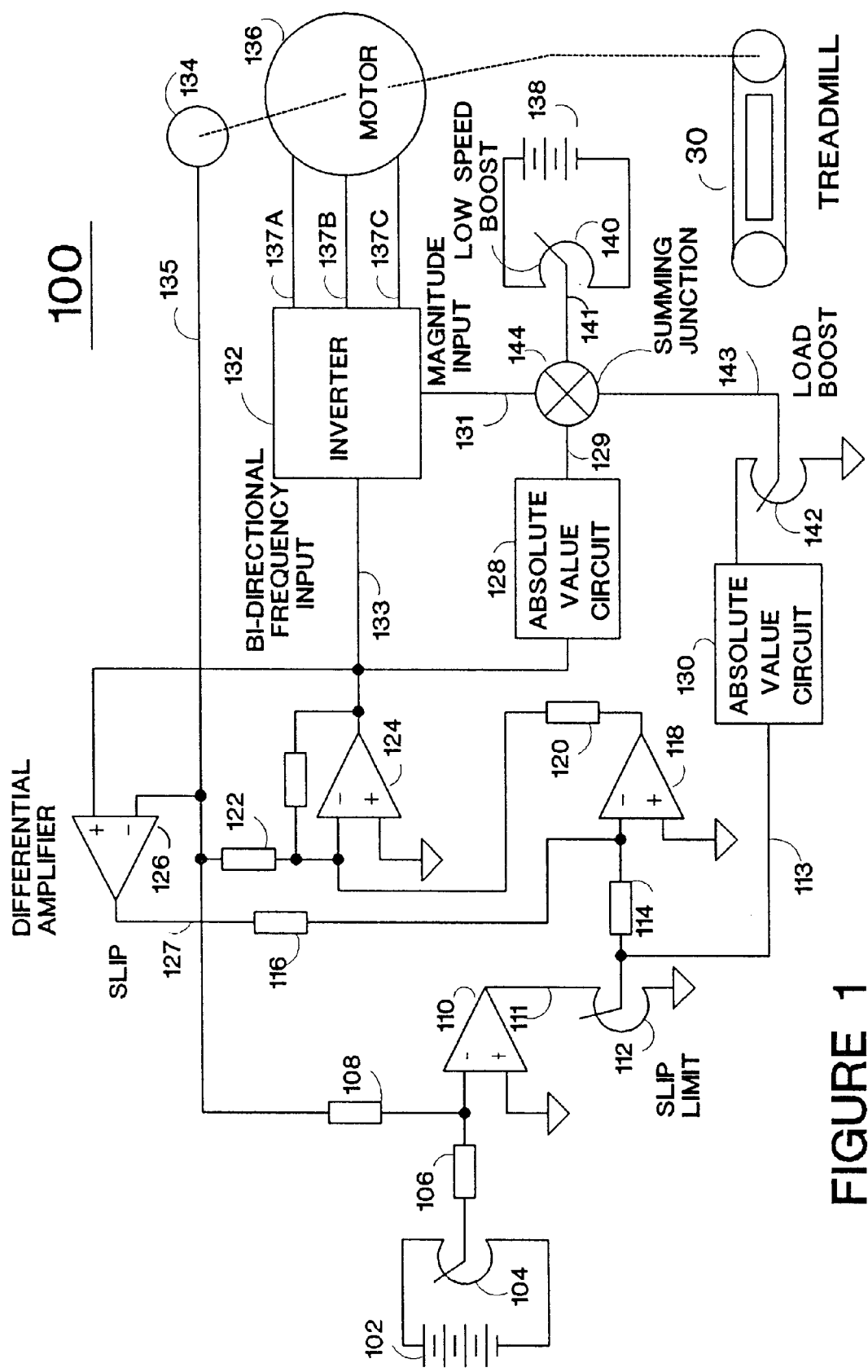
FIG. 1 is a schematic circuit diagram of the improved AC inverter drive of the present invention.

FIG. 1 shows a control strategy for this invention. Speed regulating drive 100 is comprised of inverter 132, providing power to motor 136 coupled to speed sensor 134, and associated amplifier and signal components. Motor 136 is connected to a load which, as noted above, may be treadmill 30.

Inverter 132 has two inputs. A frequency input in conductor 133 causes the inverter to produce a frequency proportional to the magnitude of the input signal in conductor 133 and a direction of phase rotation that is determined by the polarity of the signal in conductor 133.

The second input to inverter 132 is in conductor 131. The magnitude of the voltage output of the inverter is determined by the magnitude of the signal present in conductor 131.

Inverter 132 supplies power to motor 136 through conductors 137A, B, and C. Speed sensor 134, coupled to motor 136, produces a signal in conductor 135 whose magnitude is proportional to the actual speed of the motor and whose polarity is determined by the direction of the rotation of the motor.

Amplifier 110 is a speed regulating amplifier, commonly of the integrating variety, which maintains a very small error between desired speed set by potentiometer 104 connected across power supply 102, and the actual speed indicated by the signal in conductor 135 and provided through resistor 108. The output of amplifier 110 is delivered to conductor 111.

Amplifier 126 is a differential amplifier that measures the difference between the frequency applied to the motor as evidenced by the frequency input to the inverter in conductor 133 and the actual speed as evidenced by the speed feedback signal in conductor 135. This difference is by definition the "slip" of the motor, and appears as a signal in conductor 127.

Amplifier 124 is a summing amplifier with a major input from the speed feedback signal in conductor 135 through resistor 122, and a minor input from amplifier 118 through resistor 120. The output of amplifier 124 becomes the frequency input to the inverter in conductor 133. It also becomes the input to absolute value circuit 128, which input determines the magnitude of the signal in conductor 133 and feeds it to summing junction 144 through conductor 129.

If the other two signals to summing junction 144, namely the signals in conductors 141 and 143 are temporarily disregarded, it can be seen that the magnitude of the signal in conductor 133 (frequency) and the magnitude of the signal in conductor 129 are equal. Since the signal in conductor 129 acts through summing junction 144 to become the total input to the voltage magnitude input conductor 131, this means that the frequency and magnitude signals are equal and the result is a classic constant volts per Hertz inverter.

A small low speed boost signal is added to summing junction 144 through conductor 141, to provide compensation for the predominance of the resistance portion of impedance at low frequencies. The signal is generated from power supply 138 and potentiometer 140. This signal, however, is only large enough to provide the proper no load excitation, and does not contribute to the excessive heating that exists in many present day inverters where the low voltage boost provides full load voltage.

Amplifier 118 acts as a slip regulating amplifier with a reference input through resistor 114 from potentiometer 112, connected to the output of speed regulating amplifier 110. Feedback to amplifier 118 is from the slip signal in conductor 127 through resistor 116. The output of amplifier 118 is connected through resistor 120 as the minor input to amplifier 124.

As a regulating amplifier, amplifier 118 acts to keep the input reference and feedback signals equal, and regulates slip by adding or subtracting from the frequency input to the inverter, as required to satisfy the requirements of the speed regulating amplifier 110.

It can be seen that since amplifier 118 at all times maintains the magnitude of the slip signal through resistor 116 equal to the magnitude of the signal from potentiometer 112 through resistor 114, then the signal through resistor 114 must be proportional to slip. Since slip is proportional to load torque, the output from amplifier 110, which is the input to potentiometer 112 is proportional to torque. If the signal to potentiometer 112 is limited by the saturation of amplifier 110, the slip as regulated by amplifier 118 is also limited, and hence the torque is also limited, without the requirement of measuring motor current.

With torque and slip limiting, the motor currents are also limited, since excessive motor currents can only accompany excessive slip. This feature is very useful in allowing maximum acceleration or deceleration without tripping out the inverter operation. Adjustment of maximum torque is obtained by adjustment of potentiometer 112 to the desired level to protect the load or the motor.

One other feature is required. Earlier it was stated that the low voltage boost signal in conductor 141 was only for no load excitation current. Without further attention, as load increases, the impedance voltage drop in the stator would reduce excitation, causing the proportionality between slip and torque to be seriously altered, and available torque would suffer.

To prevent this problem, a signal proportional to torque is taken from potentiometer 112 in conductor 113, passed through absolute value circuit 130 to provide the magnitude of torque, and delivered to potentiometer 142. Potentiometer 142 selects a portion of this signal proportional to torque, and adds it to the voltage magnitude input through summing junction 144. This additional voltage boost proportional to torque serves to restore the flux in the motor that would otherwise be lost due to stator impedance drop.

This system works equally well for loads that tend to overhaul the motor. In this case the polarity of the output from speed regulating amplifier 110 reverses, the slip reverses, with actual speed greater than applied frequency, and the inverter regenerates the energy or absorbs it in a braking resistor. Similarly operation in the other direction of rotation of motor 136 merely involves reversing the direction of phase rotation provided by the inverter.

Figure 2:
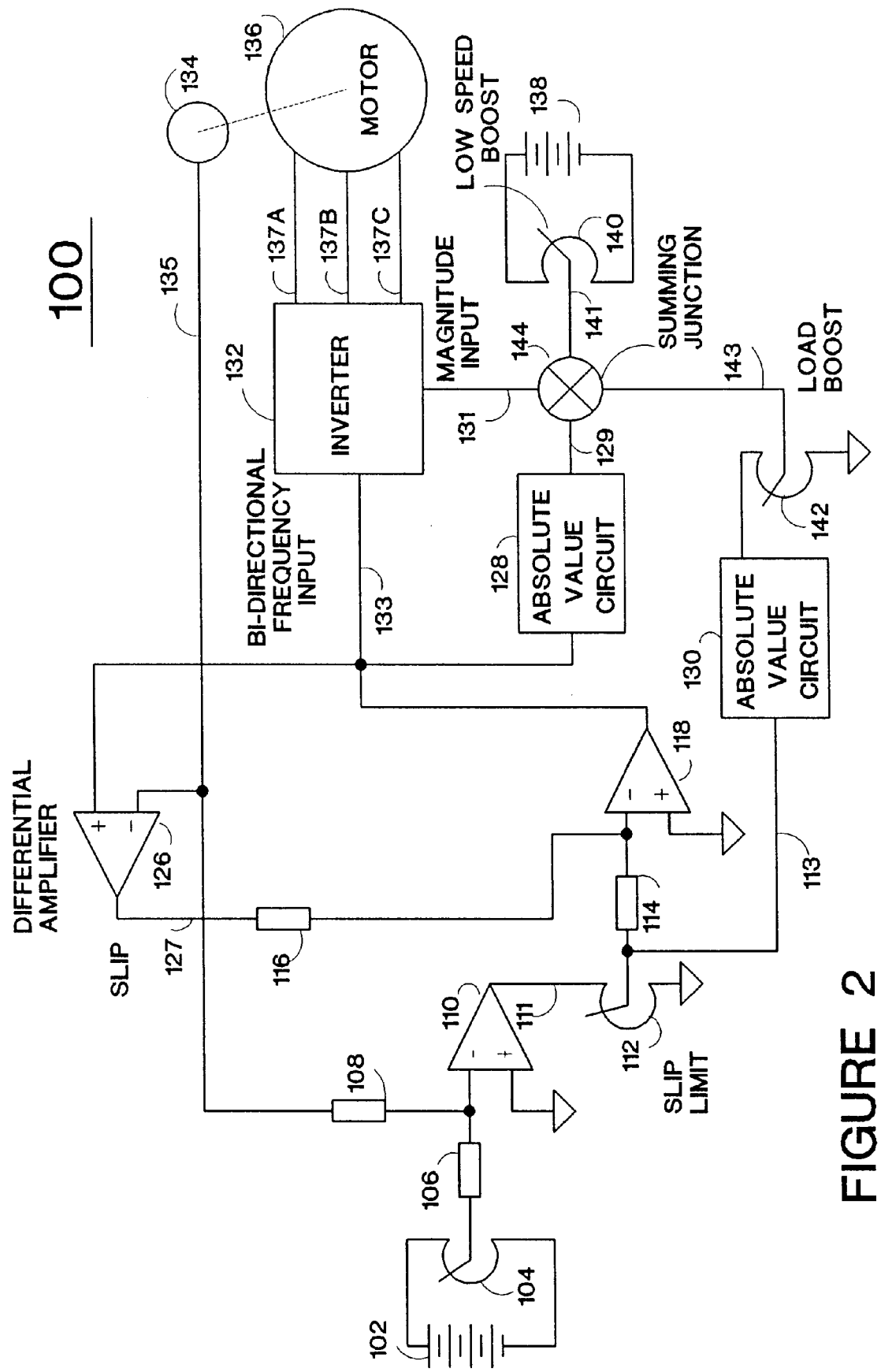
FIG. 2 is a schematic circuit diagram of another embodiment of the improved AC inverter drive of the present invention.

As shown in FIG. 2, if desired, summing amplifier 124 can be omitted and the output of slip regulating amplifier 118 connected directly to conductor 133 as the frequency controlling input to inverter 132 and as the signal forming the voltage controlling input in conductor 131. The output of amplifier 118 regulates the slip, and hence the torque of motor 136, in a manner to establish motor speed at that corresponding to the speed reference input to amplifier 110.

It is recognized that other equivalents, alternatives, and modifications aside from, or in addition to, those expressly stated, are possible and within the scope of the present invention.

We claim:

1. An improved drive for controlling the operative condition of an AC induction motor, the stator winding of which is energized by a variable frequency, variable voltage power supply, the power supply providing a voltage to the stator winding of the motor, the magnitude of which is determined by a characteristic of a first input signal to the power supply, the power supply causing the voltage to be applied to the stator winding at a frequency determined by a characteristic of a second input signal to the power supply, the energization of the stator winding causing a rotating field to be established in the motor, slip appearing in the motor as the difference between the speed of the rotating field and the speed of a rotor of the motor, said drive comprising:

a first conductor means (131) couplable to the power supply for supplying the first input signal to the power supply;

a second conductor (133) couplable to the power supply for applying the second input signal to the power supply;

a speed sensor (134) couplable to the motor rotor for providing a signal indicative of the speed of the motor rotor;

a speed reference signal source providing a signal corresponding to a desired speed of the motor;

a speed regulating amplifier (110) receiving the signals from said speed sensor and said speed reference signal source and having an output providing a speed error signal;

slip determining means (126) responsive to the speed of the motor rotor and the energization frequency of the stator winding for providing a signal indicative of the slip appearing in the motor;

a slip regulating amplifier (118) receiving the speed error signal from said speed regulating amplifier and the slip signal from said slip determining means and providing a first output signal; and summing means for receiving and summing said motor rotor speed signal from said speed sensor and said first output signal of said slip regulating amplifier and providing a second output signal forming said first input signal in said first conductor means and comprising said second input signal in said second conductor.

2. The improved drive according to claim 1 wherein said first conductor means includes an absolute value circuit (128) for said second output signal of said summing amplifier.

3. The improved drive according to claim 1 wherein said slip determining means includes a differential amplifier receiving the speed signal from said speed sensor and said second input signal.

4. The improved drive according to claim 1 wherein said summing means comprises a summing amplifier (124).

5. The improved drive means according to claim 1 further including low speed boost means coupled to said first conductor means for adding a low speed boost signal to the signal in said first conductor means.

6. The improved drive according to claim 5 wherein said low speed boost means is further defined as adding a low speed boost signal, the magnitude of which does not exceed that required to provide proper no-load excitation to the stator winding of the motor.

7. The improved drive according to claim 1 further including load boost signal means, said load boost signal means having an input coupled to the output of said speed regulating amplifier, means for selecting a portion of said speed error signal of said speed regulating amplifier to form a load boost signal, and an output coupled to said first conductor means for adding said load boost signal to the signal in said first conductor means.

8. The improved drive according to claim 7 wherein said load boost means includes an absolute value circuit.

9. The improved drive according to claim 6 further including load boost signal means, said load boost signal means having an input coupled to the output of said speed regulating amplifier, means for selecting a portion of said speed error signal of said speed regulating amplifier to form a load boost signal, and an output coupled to said first conductor means for adding said load boost signal to the signal in said first conductor means.

10. The improved drive according to claim 9 wherein said load boost means includes an absolute value circuit.

11. The improved drive according to claim 1 further including means (112) for selecting a portion of said speed error signal and providing said portion to said slip regulating amplifier, thereby to provide slip limit to said drive means.

12. The improved drive according to claim 1 further defined as a drive for controlling the speed of an AC induction motor.

13. The improved drive according to claim 1 further defined as a drive for controlling the operative condition of an AC induction motor energized by a power supply comprising an inverter.

14. The improved drive according to claim 1 for controlling the operative condition of an AC induction motor energized by a power supply in accordance with the magnitude of the first input signal and the magnitude of the second input signal.

15. The improved drive according to claim 1 further defined as a drive for controlling the operative condition of an AC motor driving a treadmill.

16. An improved drive for controlling the speed of an AC induction motor, the stator winding of which is energized by a variable frequency, variable voltage inverter, the inverter providing a voltage to the stator winding of the motor, the magnitude of which is determined by a magnitude of a first input signal to the inverter, the inverter causing the voltage to be applied to the stator winding at a frequency determined by a magnitude of a second input signal to the inverter, the energization of the stator winding causing a rotating field to be established in the motor, slip appearing in the motor as the difference between the speed of the rotating field and the speed of a rotor of the motor, said drive comprising:

a first conductor means (131) couplable to the inverter for supplying the first input signal to the inverter;

a second conductor (133) couplable to the inverter for applying the second input signal to the inverter;

a speed sensor (134) couplable to the motor rotor for providing a signal indicative of the speed of the motor rotor;

a speed reference signal source providing a signal corresponding to a desired speed of the motor;

a speed regulating amplifier (110) receiving the signals from said speed sensor and said speed reference signal source and having an output providing a speed error signal;

means for selecting a portion of said speed error signal to form a first output signal providing slip limit to said drive;

slip determining means (126) responsive to the speed of the motor rotor and the energization frequency of the stator winding for providing a signal indicative of the slip appearing in the motor;

a slip regulating amplifier (118) receiving said first output signal and the slip signal from said slip determining means and providing a second output signal;

a summing amplifier (124) receiving said motor rotor speed signal from said speed sensor and said second output signal of said slip regulating amplifier and providing an third output signal for forming said first input signal in said first conductor means and comprising said second input signal in said second conductor, an absolute value circuit (128) in said first conductor means for said output signal of said summing amplifier;

low speed boost means coupled to said first conductor means for adding a low speed boost signal to the signal in said first conductor means, the magnitude of said low speed boost signal not exceeding that required to provide proper no-load excitation to the stator winding of the motor; and load boost signal means, said load boost signal means having an input coupled to the output of said speed regulating amplifier, an absolute value circuit, means for selecting a portion of said speed error signal of said speed regulating amplifier to form a load boost signal, and an output coupled to said first conductor means for adding said load boost signal to the signal in said first conductor means.

17. An improved drive for controlling the operative condition of an AC induction motor, the stator winding of which is energized by a variable frequency, variable voltage power supply, the power supply providing a voltage to the stator winding of the motor, the magnitude of which is determined by a characteristic of a first input signal to the power supply, the power supply causing the voltage to be applied to the stator winding at a frequency determined by a characteristic of a second input signal to the power supply, the energization of the stator winding causing a rotating field to be established in the motor, slip appearing in the motor as the difference between the speed of the rotating field and the speed of a rotor of the motor, said drive comprising:

a first conductor means (131) couplable to the power supply for supplying the first input signal to the power supply;

a second conductor (133) couplable to the power supply for applying the second input signal to the power supply;

a speed sensor (134) couplable to the motor rotor for providing a signal indicative of the speed of the motor rotor;

a speed reference signal source providing a signal corresponding to a desired speed of the motor;

a speed regulating amplifier (110) receiving the signals from said speed sensor and said speed reference signal source and having an output providing a speed error signal;

slip determining means (126) responsive to the speed of the motor rotor and the energization frequency of the stator winding for providing a signal indicative of the slip appearing in the motor; and a slip regulating amplifier (118) receiving the speed error signal from said speed regulating amplifier and the slip signal from said slip determining means and providing an output signal, said output signal forming said first input signal in said first conductor means and comprising said second input signal in said second conductor.

18. The improved drive according to claim 17 wherein said first conductor means includes an absolute value circuit (128) for said output signal of said slip regulating amplifier.

19. The improved drive according to claim 17 wherein said slip determining means includes a differential amplifier receiving the speed signal from said speed sensor and said second input signal.

20. The improved drive means according to claim 17 further including low speed boost means coupled to said first conductor means for adding a low speed boost signal to the signal in said first conductor means.

21. The improved drive according to claim 20 wherein said low speed boost means is further defined as adding a low speed boost signal, the magnitude of which does not exceed that required to provide proper no-load excitation to the stator winding of the motor.

22. The improved drive according to claim 17 further including load boost signal means, said load boost signal means having an input coupled to the output of said speed regulating amplifier, means for selecting a portion of said speed error signal of said speed regulating amplifier to form a load boost signal, and an output coupled to said first conductor means for adding said load boost signal to the signal in said first conductor means.

23. The improved drive according to claim 22 wherein said load boost means includes an absolute value circuit.

24. The improved drive according to claim 21 further including load boost signal means, said load boost signal means having an input coupled to the output of said speed regulating amplifier, means for selecting a portion of said speed error signal of said speed regulating amplifier to form a load boost signal, and an output coupled to said first conductor means for adding said load boost signal to the signal in said first conductor means.

25. The improved drive according to claim 24 wherein said load boost means includes an absolute value circuit.

26. The improved drive according to claim 17 further including means (112) for selecting a portion of said speed error signal and providing said portion to said slip regulating amplifier, thereby to provide slip limit to said drive means.

27. The improved drive according to claim 17 further defined as a drive for controlling the speed of an AC induction motor.

28. The improved drive according to claim 17 further defined as a drive for controlling the operative condition of an AC induction motor energized by a power supply comprising an inverter.

29. The improved drive according to claim 17 for controlling the operative condition of an AC induction motor energized by a power supply in accordance with the magnitude of the first input signal and the magnitude of the second input signal.

30. The improved drive according to claim 17 further defined as a drive for controlling the operative condition of an AC motor driving a treadmill.

31. An improved drive for controlling the speed of an AC induction motor, the stator winding of which is energized by a variable frequency, variable voltage inverter, the inverter providing a voltage to the stator winding of the motor, the magnitude of which is determined by a magnitude of a first input signal to the inverter, the inverter causing the voltage to be applied to the stator winding at a frequency determined by a magnitude of a second input signal to the inverter, the energization of the stator winding causing a rotating field to be established in the motor, slip appearing in the motor as the difference between the speed of the rotating field and the speed of a rotor of the motor, said drive comprising:

a first conductor means (131) couplable to the inverter for supplying the first input signal to the inverter;

a second conductor (133) couplable to the inverter for applying the second input signal to the inverter;

a speed sensor (134) couplable to the motor rotor for providing a signal indicative of the speed of the motor rotor;

a speed reference signal source providing a signal corresponding to a desired speed of the motor;

a speed regulating amplifier (110) receiving the signals from said speed sensor and said speed reference signal source and having an output providing a speed error signal;

means for selecting a portion of said speed error signal to form a first output signal providing slip limit to said drive;

slip determining means (126) responsive to the speed of the motor rotor and the energization frequency of the stator winding for providing a signal indicative of the slip appearing in the motor; and a slip regulating amplifier (118) receiving said first output signal and the slip signal from said slip determining means and providing a second output signal, said second output signal forming said first input signal in said first conductor means and comprising said second input signal in said second conductor, an absolute value circuit (128) in said first conductor means for said second output signal;

low speed boost means coupled to said first conductor means for adding a low speed boost signal to the signal in said first conductor means, the magnitude of said low speed boost signal not exceeding that required to provide proper no-load excitation to the stator winding of the motor; and load boost signal means, said load boost signal means having an input coupled to the output of said speed regulating amplifier, an absolute value circuit, means for selecting a portion of said speed error signal of said speed regulating amplifier to form a load boost signal, and an output coupled to said first conductor means for adding said load boost signal to the signal in said first conductor means.

* * * * *